June 14, 1932.  E. E. DRAPER  1,862,847
METHOD OF MAKING STEREOSCOPIC PICTURES
Filed Aug. 8, 1930

INVENTOR
Ernest E. Draper
BY Harry Lea Dodson
ATTORNEY

Patented June 14, 1932

1,862,847

UNITED STATES PATENT OFFICE

ERNEST E. DRAPER, OF SCARSDALE, NEW YORK, ASSIGNOR TO THE PERSER CORPORATION, OF NEW YORK, N. Y., A CORPORATION OF NEW YORK

METHOD OF MAKING STEREOSCOPIC PICTURES

Application filed August 8, 1930. Serial No. 473,930.

My invention relates to "Depthographs," a trade-name employed to describe pictures produced by the method described in United States Patent No. 1,260,682, issued March 26, 1918, to Clarence W. Kanolt, which produces stereoscopic pictures by moving the camera through the arc of a circle about the object to be photographed, the exposure being made through a grating or screen formed of alternate opaque and transparent vertical lines.

My invention has for its object, to provide a method of making positives from negatives taken as described in my copending application, Serial No. 473,929, filed August 8, 1930, in which I use a multiplicity of small lenses arranged in the arc of a circle, combined with a corresponding number of prisms, arranged adjacent said lenses, for superimposing the multiplicity of images, with a screen consisting of alternate opaque and transparent vertical lines, spaced from a sensitized plate, to produce a negative, the positive of which will be stereoscopic when viewed with a similar vertical lined screen placed behind it.

If all the lenses were pointed straight ahead, each lens would have a different view, but by combining a prism with each lens I am able to superimpose the images. Unless the picture is viewed in accordance with the hereinafter described manner, it is well known that the result would be pseudoscopic, for I do not use the prisms to reverse the image, but to insure overlaps of the image from the light reflected from the object to be photographed.

In the accompanying drawing, to be considered as part of this specification, I have illustrated my method, in a diagrammatic way, in which—

Figure 1:
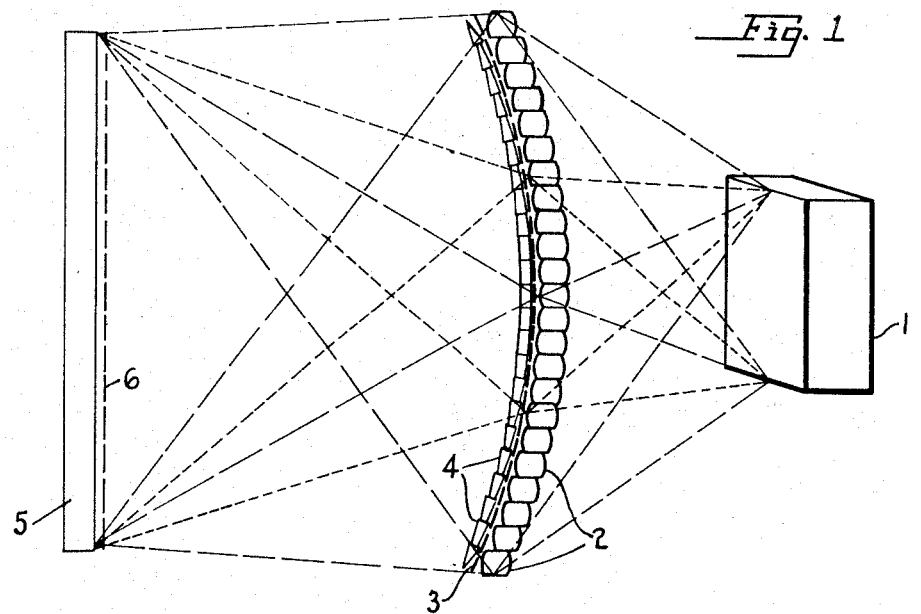
Fig. 1 is a view showing how I make a negative.

As shown in the drawing, the object 1, which is to be photographed, is placed before a plurality of lenses 2. These lenses 2 are arranged preferably in the arc of a circle, which should subtend as large an angle from the object 1 to be photographed as does the lens in the camera employing the Kanolt method. The only limitations are those imposed by commercial requirements, as obviously there will be a point where the cost would make it prohibitive, although otherwise there is no limitation upon the use of my method.

The lenses 2 are all of the same focal length, and are so directed that each one receives the light rays from the same area and objects in the object space, except as it varies due to the different angle of view. Suitable diaphragms 3 are provided for the lenses 2. The light rays from each lens 2 pass through a prism 4, which is so mounted that it will superimpose upon the exposed surface of a sensitized plate 5 the image thrown thereon exactly upon all the images from all the lenses 2, except, as will be obvious to those skilled in the art, they will differ as the images differ on account of the different angles of view.

Figure 2:
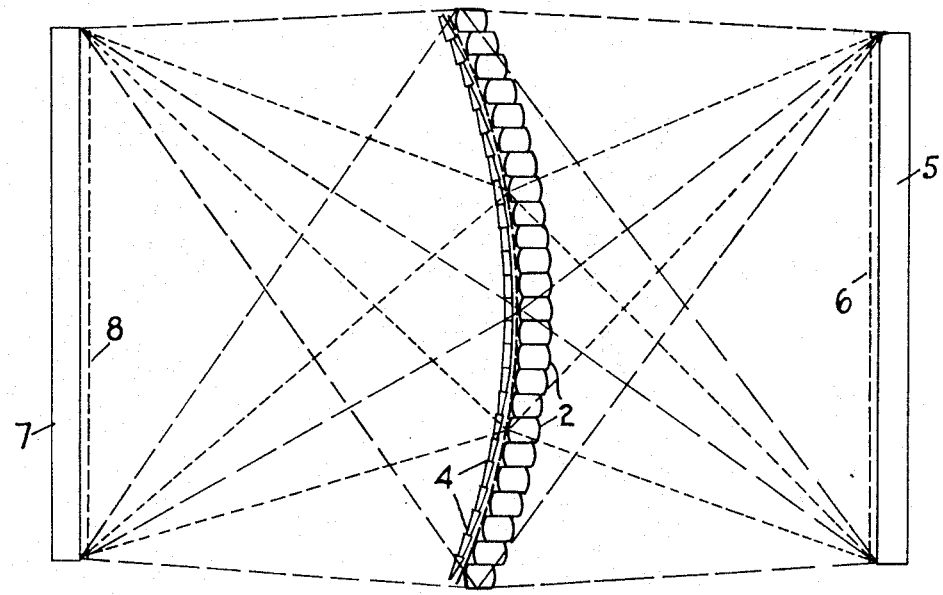
Fig. 2 shows how to make a positive from the negative. Similar reference numerals refer to similar parts throughout the entire description.

In front of the plate 5, and spaced therefrom, I mount a screen 6, which is formed of alternate opaque and transparent vertical lines. After the negative 5 is formed, it is placed as shown in Fig. 2, and the image of the negative 5 is projected, by means of a suitable light source (not shown), through the taking grating 6, through the multiplicity of lenses 2, or a similar arrangement of lenses, and through the prisms, on to a sensitized plate 7, which is located slightly behind another taking grating 8. The result will be the production upon the plate 7 of a positive which will give correct relief.

Difficulties are sometimes encountered when attempts are made to produce positives by contact printing, because of the difficulty of securing accurate positioning of the lines, due to various causes produced by atmospheric and temperature conditions. However, by following the foregoing method, correct printing can be obtained without difficulty.

Having described my invention, what I regard as new, and desire to secure by Letters Patent of the United States, is:

1. The method of printing stereoscopic positives from relief negatives, which consists of projecting the image through a multiplicity of lenses arranged on the arc of a circle, adjacent prisms and a screen located between said negative and said lenses, on to a sensitized plate placed slightly behind another similar screen, both of said screens being formed of alternate opaque and transparent vertical lines.

2. The method of printing stereoscopic positives from relief negatives, which consists of projecting the image, through a multiplicity of lenses arranged on the arc of a circle, the chord of which is greater than the width of the object to be photographed, adjacent prisms and a screen located between said negative and said lenses, on to a sensitized plate placed slightly behind another similar screen, both of said screens being formed of alternate opaque and transparent vertical lines.

3. The method of printing stereoscopic positives from relief negatives, which consists of projecting the image, through a multiplicity of lenses arranged on the arc of a circle, the chord of which is comparable to the diameter of the object to be photographed, adjacent prisms and a screen located between said negative and said lenses, on to a sensitized plate placed slightly behind another similar screen, both of said screens being formed of alternate opaque and transparent vertical lines.

ERNEST E. DRAPER.